United States Patent
El Defrawy et al.

(10) Patent No.: US 10,523,654 B1
(45) Date of Patent: Dec. 31, 2019

(54) SYSTEM AND METHOD TO INTEGRATE SECURE AND PRIVACY-PRESERVING BIOMETRICS WITH IDENTIFICATION, AUTHENTICATION, AND ONLINE CREDENTIAL SYSTEMS

(71) Applicant: HRL Laboratories, LLC, Malibu, CA (US)

(72) Inventors: Karim El Defrawy, Santa Monica, CA (US); Joshua W. Baron, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 321 days.

(21) Appl. No.: 15/216,285

(22) Filed: Jul. 21, 2016

Related U.S. Application Data

(60) Provisional application No. 62/195,266, filed on Jul. 21, 2015.

(51) Int. Cl.
*H04L 29/06* (2006.01)

(52) U.S. Cl.
CPC .......... *H04L 63/0815* (2013.01); *H04L 63/06* (2013.01); *H04L 63/0861* (2013.01)

(58) Field of Classification Search
CPC ............................ H04L 63/06; H04L 63/0861
See application file for complete search history.

(56) References Cited

U.S. PATENT DOCUMENTS

| | | | |
|---|---|---|---|
| 2010/0037046 A1* | 2/2010 | Ferg ......................... | H04L 9/321 713/155 |
| 2017/0185761 A1* | 6/2017 | Stanwood ............... | G06F 21/32 |

OTHER PUBLICATIONS

Deswarte el al., "A Proposal for a Privacy-preserving National Identity Card" Transactions on Data Privacy 3 (2010), CNRS ; LAAS ; 7 avenue du Colonel Roche, F-31077 Toulouse, France, pp. 253-276.*

Kantara Initiative (http://kantarainitiative.org/) , downloaded on Jul. 26, 2016, pp. 1-2.

One ID (http://www.oneid.com/) , downloaded on Jul. 26, 2016, pp. 1-4.

IBM Identity Mixer (Idemix, http://www.zurich.ibm.com/idemix/), downloaded on Jul. 26, 2016, pp. 1-2.

https://en.wikipedia.org/wiki/Fuzzy_extractor, downloaded on Jul. 26, 2016, pp. 1-8.

(Continued)

*Primary Examiner* — Harunur Rashid
(74) *Attorney, Agent, or Firm* — Tope-McKay & Associates

(57) ABSTRACT

Described is a system for the implementation of biometric scanning in a user-privacy preserving fashion with respect to identification, authentication, and online credential systems. At enrollment, the user enrolls or initially registers at a physical location, where the user is provided a Fuzzy Extractor (FE) encrypted output (Enc(R)). The user is then registered with an online server, which creates an ID-Wallet for the user and stores the ID-Waller. During operation, the user sends an authentication request to the online server, which provides a corresponding authentication response. The user or user's client then extracts secret (R) for user authentication. The user can then be authenticated with the online server to retrieve credentials from the ID-Wallet, which can be used for a variety of online services.

7 Claims, 5 Drawing Sheets

(56) References Cited

OTHER PUBLICATIONS

Dodis, Yevgeniy, et al. "Fuzzy extractors: How to generate strong keys from biometrics and other noisy data." SIAM journal on computing 38.1 (2008): pp. 97-139.

Dodis, Yevgeniy, et al. "Fuzzy extractors: How to generate strong keys from biometrics and other noisy data." In Christian Chain and Jan Camenisch, editors, Advances in Cryptology—EUROCRYPT 2004, vol. 3027 of Lecture Notes in Computer Science, pp. 79-100, Springer-Verlag, 2004.

\* cited by examiner

SYSTEM AND METHOD TO INTEGRATE SECURE AND PRIVACY-PRESERVING BIOMETRICS WITH IDENTIFICATION, AUTHENTICATION, AND ONLINE CREDENTIAL SYSTEMS

CROSS-REFERENCE TO RELATED APPLICATIONS

This is a non-provisional patent application of 62/195,266, filed on Jul. 21, 2015, the entirety of which is hereby incorporated by reference.

BACKGROUND OF INVENTION (1) Field of invention

The present invention relates to system security and, more specifically, to an online credential verification system using biometric scanning in a user-privacy preserving fashion with respect to identification and authentication.

(2) Description of Related Art

System security is necessary to secure networks and other computer systems from adverse actions. As technology has developed, a variety of security measures have been implemented, including using biometric-based identification. Current biometrics-based identification, authentication and access control systems store the templates of biometrics (whether in clear or in encrypted form) on secure backend servers or databases. Pattern matching or distance measure algorithms are used to compare a users' supplied biometrics when the user interacts with such systems. There are several shortcomings to this current approach. Although backend servers and databases may be secured through traditional mechanisms of access control (for example, using firewalls), and although biometric templates may be stored in encrypted form, this does not preclude the possibility of a successful attack that infiltrates them and obtains such biometric templates. Once such biometric templates are obtained, a fake biometric may be constructed (though such reconstruction may be easy or hard depending on the specific biometric used, e.g., a fingerprint is easier to replicate than an iris biometric).

One successful automated breach of a server or database storing biometric templates can reveal thousands of biometrics which could cause serious risk of massive identity theft and fraud. Another problem is that since a person's biometric does not change, if the user uses his/her biometric for identification, authentication and access control in several systems, the stored template will be the same. This compromises user privacy and does not allow for transparent revocation. It is desirable if the template stored in each case is different, yet allows the system to identify the user when it interacts with it. This prevents linking of multiple accounts to the same individual in the case of a successful breach of security, which is unfortunately a common case these days.

Current theoretical constructions of cryptographic algorithms and protocols to secure biometric-based authentication and access control consider basic notions of distance (e.g., hamming and edit distance). In reality several biometrics systems utilize more complicated distance measures (e.g., face recognition). With respect to the instance of identity systems, there are several identity systems on the Internet; however, none of them utilize biometrics. More specifically, none relies on biometrics-based authentication using fuzzy extractors.

Biometrics are unique to each individual and thus provide a mechanism to reliably identify them, addressing a lack of confidence and assurance in online identities of users. Biometrics provide a natural and single usable interface for user authentication, addressing the requirement of individuals to maintain dozens of usernames and passwords. Addressing security and privacy concerns of biometrics will contribute to solving issues relating to an increasing lack of online privacy in addition to rendering biometrics more likely to be accepted by users because they do not require users to carry additional tokens or remember a lot of additional information for authentication.

Thus, a continuing need exists for a system that combines privacy-preservation features with biometric identification.

SUMMARY OF INVENTION

This disclosure provides a system for online identification authentication. The system includes one or more processors and associated memory (e.g., non-transitory computer readable medium) with executable instructions encoded thereon. Upon execution of the instructions, the one or more processors perform an authentication, wherein a user is authenticated based on use of a Fuzzy Extractor (FE) and the user's biometric data.

In another aspect, the system performs a credential retrieval, where the authentication and credential retrieval are an authentication and credential retrieval phase, wherein a user is authenticated and retrieves credentials for use with online services based on the FE and the user's biometric data.

Additionally, the system performs an enrollment phase, in which a user is registered and provided an ID-Wallet for storing user credentials.

Further, performing the enrollment phase further comprises operations of: performing an initial registration of the user, where the user is present at a physical location; providing the user the FE encrypted output (Enc(R)); registering the user with an online server; and creating the ID-Wallet for storing user credentials and storing the ID-Wallet with the online server.

In yet another aspect, performing the initial registration further comprises operations of generating a user Identification (ID) for the user, registering an account for the user, receiving the user's biometric data, and receiving user credentials.

Further, in registering the user with an online server, the user ID, credentials, and an FE helper string (P) associated with the FE encrypted output are registered to the online server.

Additionally, performing the authentication and credential retrieval phase further comprises operations of: receiving, at the online server, an authentication request from the user; providing the user an authentication response; extracting secret (R) for user authentication; and authenticating the user to the online server to allow the user to retrieve credentials from the ID-Wallet, whereby the credentials can be used for online services.

In another aspect, in receiving the authentication request, the online server receives the user ID.

In yet another aspect, in providing the user an authentication response, the online server provides the user with the FE helper string (P) that is used in extracting secret (R) for authentication and unlocking of the ID-Wallet.

Further, in extracting secret (R) for user authentication, the FE extracts a uniformly random string using the FE helper string (P) and the user's biometric data.

Additionally, in authenticating the user to the online server to allow the user to retrieve credentials from the ID-Wallet, the retrieved credentials remain unknown to the online server storing the ID-Wallet.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
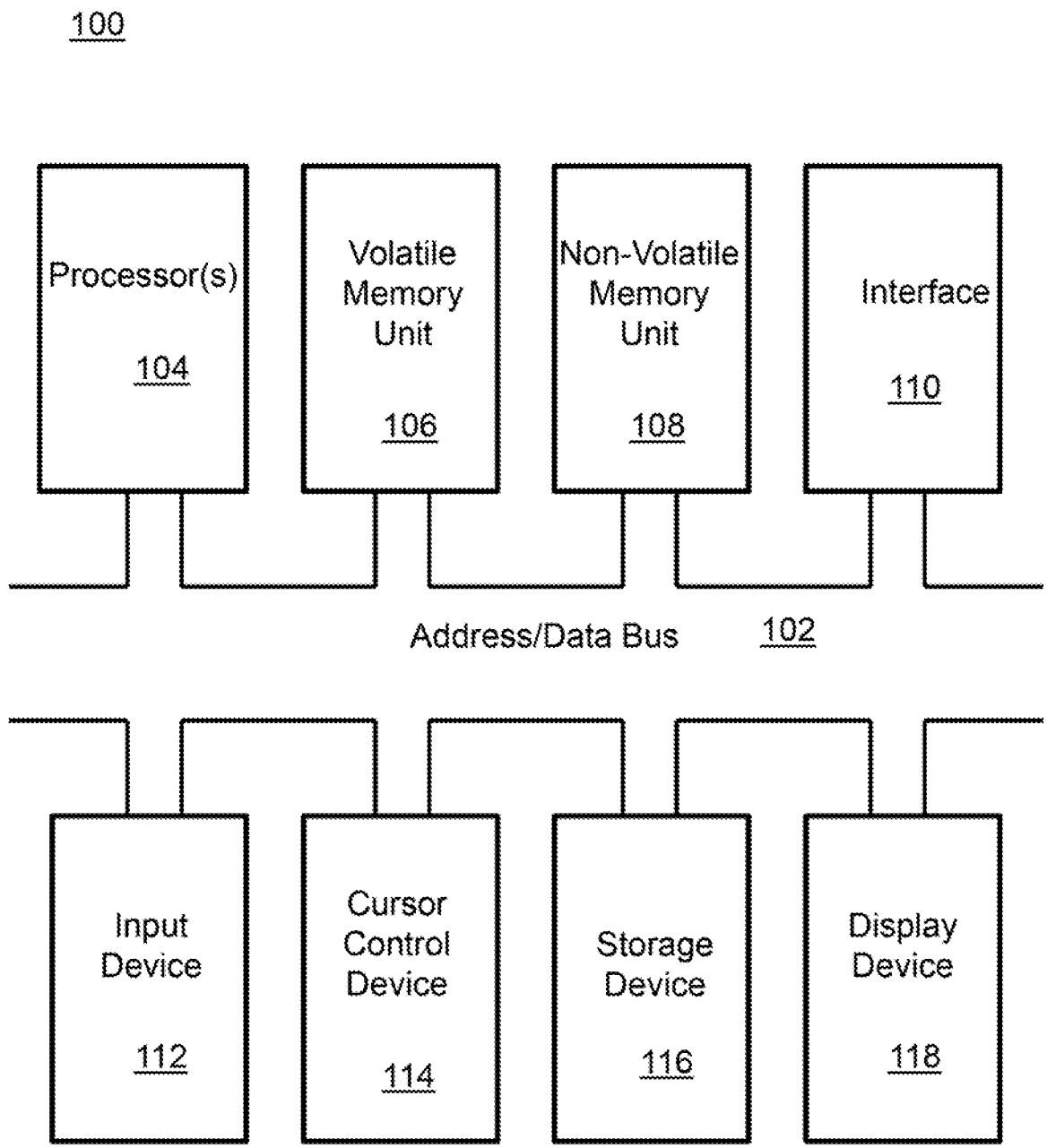
FIG. 1 is a block diagram depicting the components of a system according to various embodiments oldie present invention.

The present invention relates to system security and, more specifically, to an online credential verification system using biometric scanning in a user-privacy preserving fashion with respect to identification and authentication. The following description is presented to enable one of ordinary skill in the art to make and use the invention and to incorporate it in the context of particular applications. Various modifications, as well as a variety of uses in different applications will be readily apparent to those skilled in the art, and the genera principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of the various principal aspects of the present invention is provided. Subsequently, an introduction provides the reader with a general understanding of the present invention. Finally, specific details of various embodiment of the present invention are provided to give an understanding of the specific aspects.

(1) Principal Aspects

Various embodiments of the invention include three "principal" aspects. The first is an online credential verification system for the preservation of privacy during the employment of biometric authentication. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include anon-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
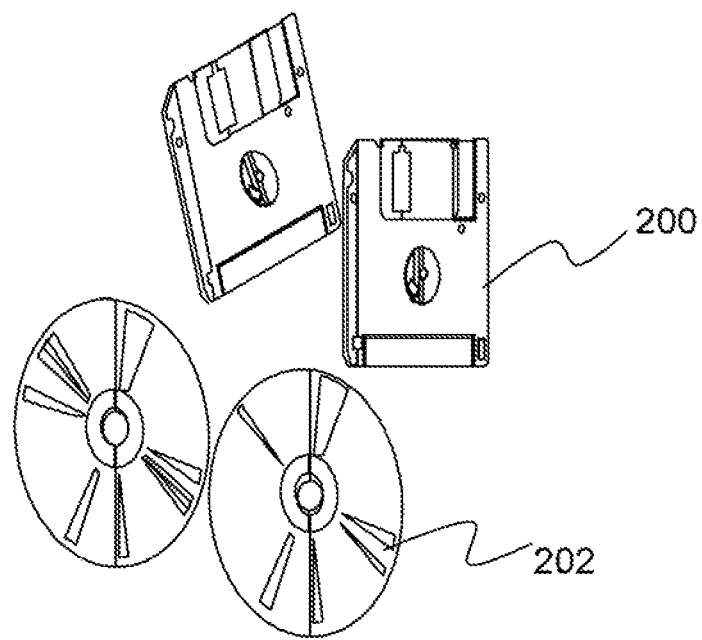
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a. whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

This disclosure provides a system and method to integrate secure and privacy-preserving biometrics with identification and authentication systems and online credential systems. Specifically, the system is online credential verification system that allows secure authentication of users based on their biometrics, while preserving the privacy of their biometric templates. The privacy of user's biometric template is preserved by not storing it at any backend-server or database. This ensures security and privacy of user's sensitive biometric data, even if the authentication infrastructure is compromised. Since biometrics of users do not change (e.g., finger pints or iris patterns), it is of utmost importance to ensure that they are not disclosed to any unauthorized entity. The best remedy for such unwanted disclosure is to not store the biometric on the authentication infrastructure's side, but to store a random string that allows authentication of users without revealing information about their biometric (or while revealing information that does not allow reconstruction of said biometric and/or impersonation of the user).

An additional feature of the system described herein is to allow users to maintain multiple identities and credentials, including anonymous ones, in what is called an identity wallet. Users can have service providers and other online entities deposit long-term (or one-time, anonymous or pseudonomous) credentials into these wallets to be later used by users to access online services or perform online transactions.

The invention relies on the following features: (1) a cryptographic primitive, Fuzzy Extractor, to preserve biometric data privacy and provide authentication of users based on their biometrics; (2) an "Identity Wallet" that is used as a digital wallet to store long-term (or one-time, anonymous or pseudonomous) credentials safely and securely; (3) a secure and user friendly protocol to authenticate users and unlock their identity wallet based on user's biometric, whereby users can subsequently use unlocked biometrics to access online services or perform online transactions; and (4) a system that combines all the above to facilitate the secure and privacy-preserving operation using biometrics and credentials/identities.

This invention is a dramatic improvement over the prior art in usability and user friendliness of user identification and authentication services by incorporating biometric-based security while increasing security by not storing biometric information unencrypted on backend servers and databases, eliminating the potential of a single breach of any backend system to reveal biometrics. As can be appreciated by those skilled in the art, such a system can be implemented in a variety of other systems. As a non-limiting example, a car manufacturer can use this invention for keyless biometric access to internet-enabled vehicles. Individuals who have access to the vehicle can do so without risk of biometric data leakage; individuals without proper access will not be able to access the vehicle. As another example, any industrial manufacturer can use this invention for access control, allowing only authorized users access to facilities and processes, without revealing user biometric information and without allowing any unauthorized users access. Furthermore, military manufacturers, armament technology developers and similar sorts of governmental and non-governmental organizations can use this invention for facility access for extremely sensitive facilities. Such facilities may not wish to store lists of individuals who may access particular rooms, such as SCIFs. This invention will allow only authorized users to access such facilities without storing their identifying information at the facility.

(3) Specific Details of Various Embodiments

As mentioned above, this disclosure provides an online credential verification system. The system and method includes a platform to enable operation of Secure and Privacy-preserving biOmetrics for Trusted identities (SPOT) in cyberspace, referred to herein as SPOT. The SPOT platform is designed from the ground up with usability in mind; it works with a variety of biometrics and provides unique privacy-preserving features such as avoiding storage of sensitive biometric data. It also allows users to utilize different credentials (including anonymous) and provides unforgeable secure records of authenticated online transactions.

An important challenge facing an identity ecosystem where biometrics are used is designing a user-friendly identification and authentication system, that can utilize different biometrics while guaranteeing privacy of user's sensitive biometric data, and still enable anonymous usage of online services. The system of the present invention, SPOT, allows users to be identified and authenticated by online services based on biometrics without storing user's biometric data. It also allows users to unlock credentials stored in, a secure online identity wallet (ID-Wallet) using their biometrics. Unlocked credentials (which may be anonymous) can then be used to access online services and perform online transactions.

(3.1) SPOT architecture

Figure 3:
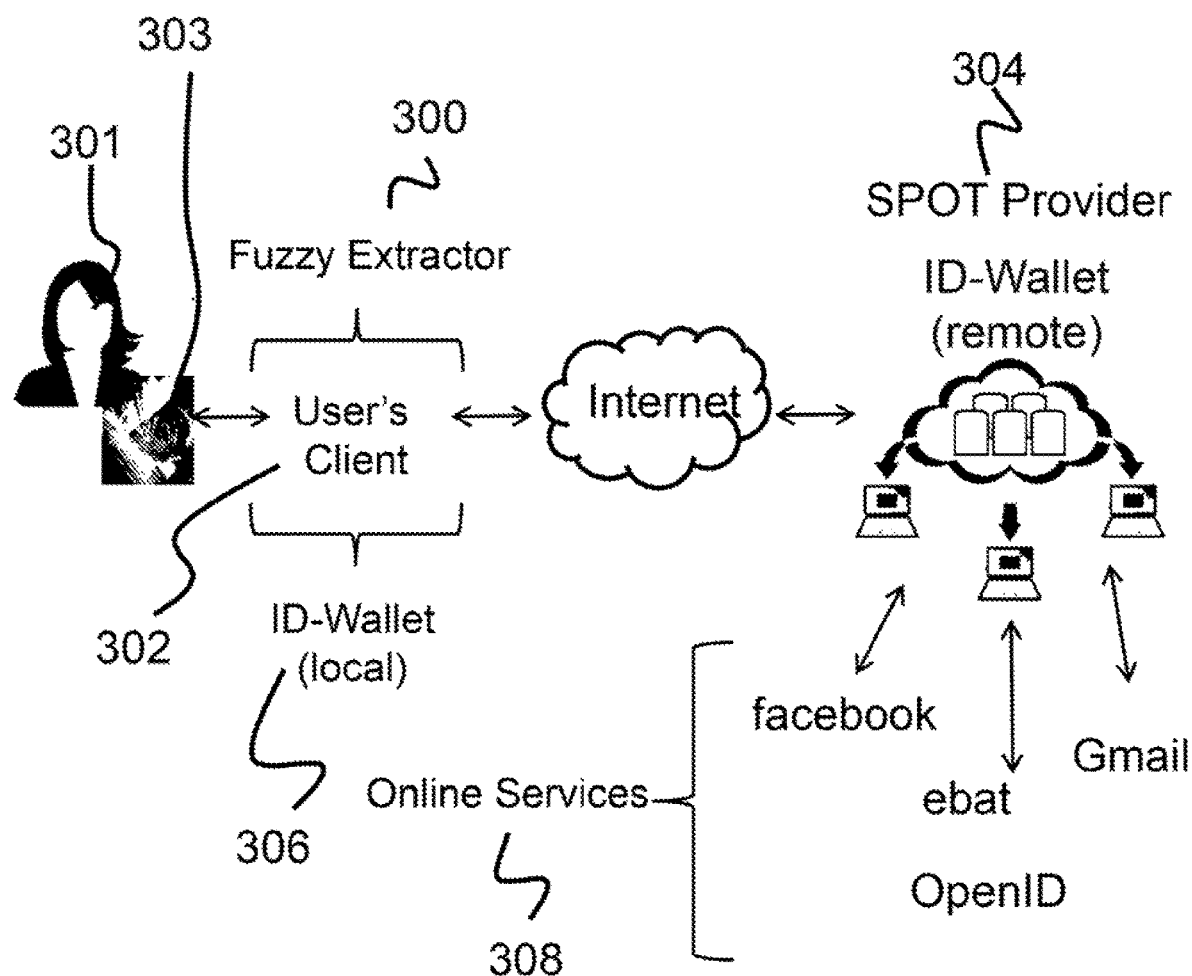
FIG. 3 is a flowchart depicting architecture for a Secure and Privacy-Preserving Biometrics for Trusted Identities (hereafter SPOT) provider according to various embodiments of the present invention.

As shown in FIG. 3, the SPOT architecture includes a fuzzy-extractor 300, a user's client 302, a SPOT provider 304, and an identity (ID) wallet 306. Each of these components are described in further detail below.

The first of these, the fuzzy-extractor (hereafter FE) 300, is a cryptographic primitive that extracts a uniformly random string, R, from the FE's input, w, which can be a biometric, in a noise-tolerant way. R can be used for identification and authentication of users when w is a biometric. To help in the reproduction of R, an FE, when used for the first time, outputs a helper string, P, which can safely be made public (i.e., stored on an untrusted server) without decreasing security of R or revealing enough information to reconstruct w (i.e., the biometric). The FE 300 process is described, for example, at Wikipedia under "Fuzzy Extractor" (see en.wikipedia.org/wiki/Fuzzy_extractor, taken on Jul. 20, 2016), which is incorporated by reference as though fully set forth herein. The FE 300 is also described in Dodis, Yevgeniy, et al. "Fuzzy extractors: How to generate strong keys from biometrics and other noisy data." *SIAM journal on computing* 38.1 (2008): 97-139, and in Dodis, Yevgeniy, et al. "Fuzzy extractors: How to generate strong keys from biometrics and other noisy data." *In Christian Chain and Jan Camenisch, editors, Advances in Cryptology*—EUROCRYPT 2004, volume 3027 of *Lecture Notes in Computer Science*, pages 79-100, Springer-Verlag, 2004, both of which are incorporated by reference as though fully set forth herein.

The second major component of the SPOT architecture lice in the user client 302. The user client 302 is software and/or hardware that may be implemented using a computing device, such as a tablet, pc, or phone, etc., that the user 301 has physical access to and that can implement the FE 300 process. The user client 302 captures a user's 301 biometric data 303 and uses a FE 300 scheme to generate a secret that will be used to identify and authenticate the user 301 to the SPOT provider's online presence. The biometric data 303 is captured by one or more readers capable of acquiring one or more of a user's retina, fingerprint, handprint, and voiceprint.

Further, the client 302 unlocks the ID-Wallet 306 and retrieves required credentials from it in a privacy-preserving manner. A cryptographically signed record of such retrieval provides an unforgeable record of the authentication that was performed and can be used for accountability purposes.

The third major component of the SPOT architecture introduces a new entity in the online identity ecosystem, called the SPOT provider 304, with both a physical and online presence. Regarding the physical presence, the SPOT provider 304 has an actual storefront or other physical location where a user 301 can go register an account and verify his/her identify. In addition or alternative to generating a new physical storefront, the SPOT provider 304 physical presence can be implemented as a new service by existing retail locations, such as by a bank, cellular carrier storefront, etc., that agrees to implement and provide such a service.

The SPOT provider 304 runs the service to authenticate users 301 based on biometrics without storing their actual biometric data 303. The SPOT provider 304 runs servers that receive authentication requests from users through their clients 302 and unlocks their ID-Wallets 306, stored on the server, and supplies users with the required credentials to perform desired online transactions.

The fourth major component of the SPOT architecture is the ID-Wallet 306, which securely stores user's 301 credentials (which can be anonymous). Users 301 enroll in the system and utilize their biometric data 303 together with a single short pin to unlock the ID-Wallet 306 and retrieve credentials they require to access online services 308. When users 301 access their ID-Wallets 306, the server storing the ID wallet 306 does not learn which credentials have been retrieved. SPOT also allows users to store ID-Wallets 306 locally on their devices (e.g., phone, tablet, computer, etc.) if storage on the cloud is undesired.

The online services 308 are provided by a variety of online service providers eBay®, Facebook®, Amazon®, etc.) that have implemented the system herein to access the services, The process by which the online services 308 engage with the system is described in further detail below.

(3.2) SPOT Operation

This section provides an overview of SPOT's operation. Two phases are required in SPOT's operation, an Enrollment Phase and an Authentication and Credential Retrieval Phase. Each of these phases are described in further detail below.

(3.2.1) SPOT Enrollment Phase

Figure 4:
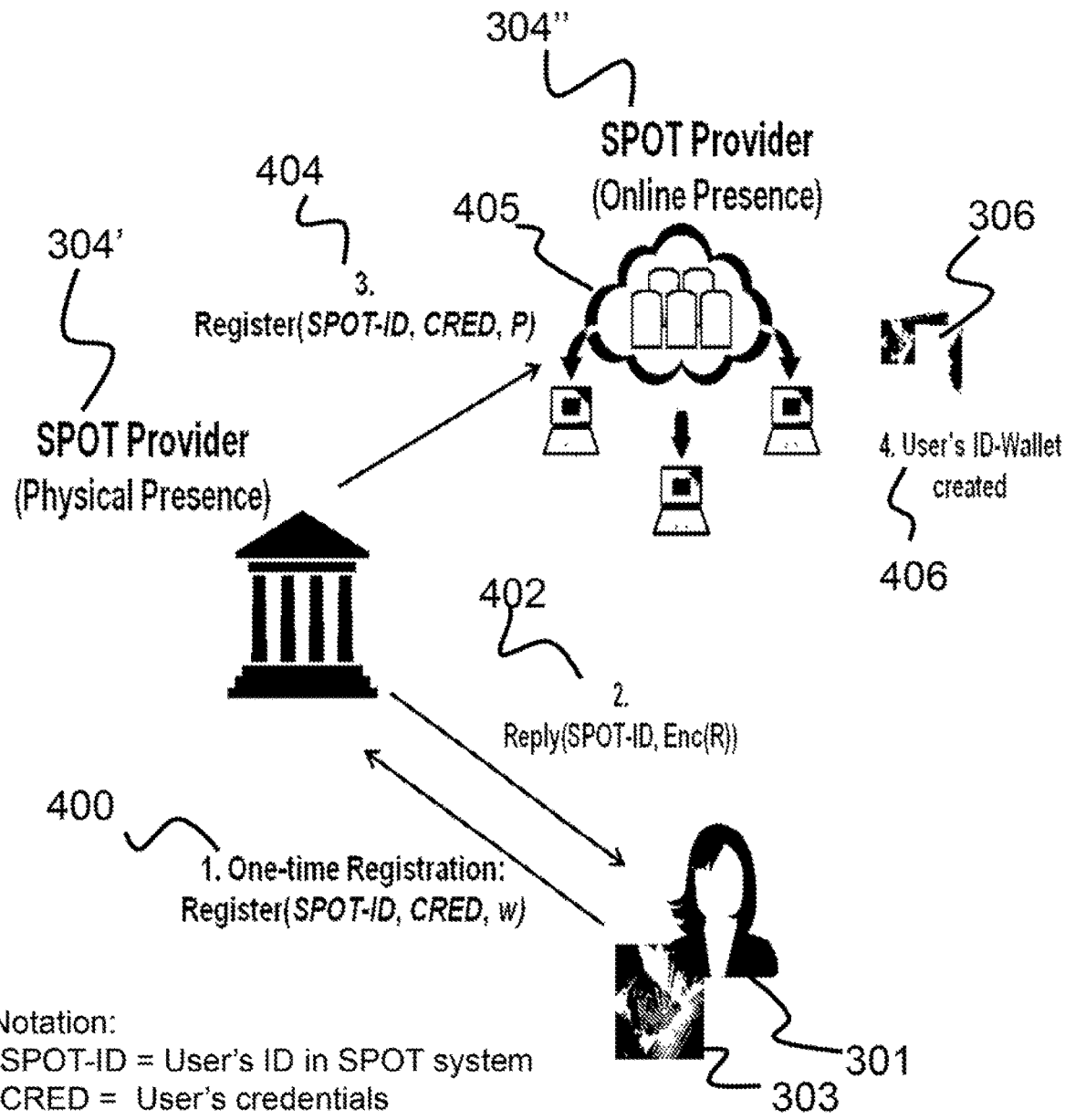
FIG. 4 is a flowchart depicting disclosing an enrollment phase of operation of the system, where a user obtains the ability to make use of the entire SPOT system in a number of steps.

In terms of SPOT's operation, FIG. 4 illustrates the first of two phases, known as the enrollment phase. This phase occurs in a number of steps, as outlined below.

The first step is an initial registration step 400 and involves a user 301 creating an account with the SPOT provider's physical presence 304' by generating a SPOT-ID (i.e., user ID), registering an account, and supplying her biometric (w) data 303 and credentials to be securely stored in her ID-Wallet 306. The SPOT-ID is generated by the SPOT provider 304'. The biometric (w) data 303 is supplied by, for example, one or more of a user's retina, fingerprint, handprint, and voice. Finally, the credentials may be an account identifier such as a bank account number, an account for an online merchant and/or physical store (e.g., Amazon®, Best Buy®, Costco®, etc.), a username, or other reference.

In the next, reply step 402, the SPOT provider's physical presence 304' supplies the user 301 and/or the SPOT Provider 304" with the FE's encrypted output (Enc(R)). In other words, the SPOT provider's physical presence 304' includes the necessary hardware and/or software to run the Fuzzy Extractor (FE) and generate the FE's encrypted output (Enc(R)), which is provided to the user 301 and/or the SPOT Provider 304" via secure communication (e.g., via D encrypted transmission).

Next, the SPOT provider's physical presence 304' registers 404 the user's SPOT-ID, credentials (anonymous or pseudonyms) in addition to the FE's helper string (P) to the SPOT online presence 304". For example, the hardware and/or software at the SPOT provider's physical presence 304' accesses the SPOT online presence 304" (i.e., SPOT server(s) 405) to register 404 the material with the online SPOT servers.

In the last step 406, an ID-Wallet 306 for the user 301 is created online and stored on the SPOT server 405 (i.e., SPOT online presence 304"). The ID-Wallet 306 is, in essence, a file that securely stores user's 301 credentials.

(3.2.2) SPOT Authentication & Credential Retrieval Phase

Figure 5:
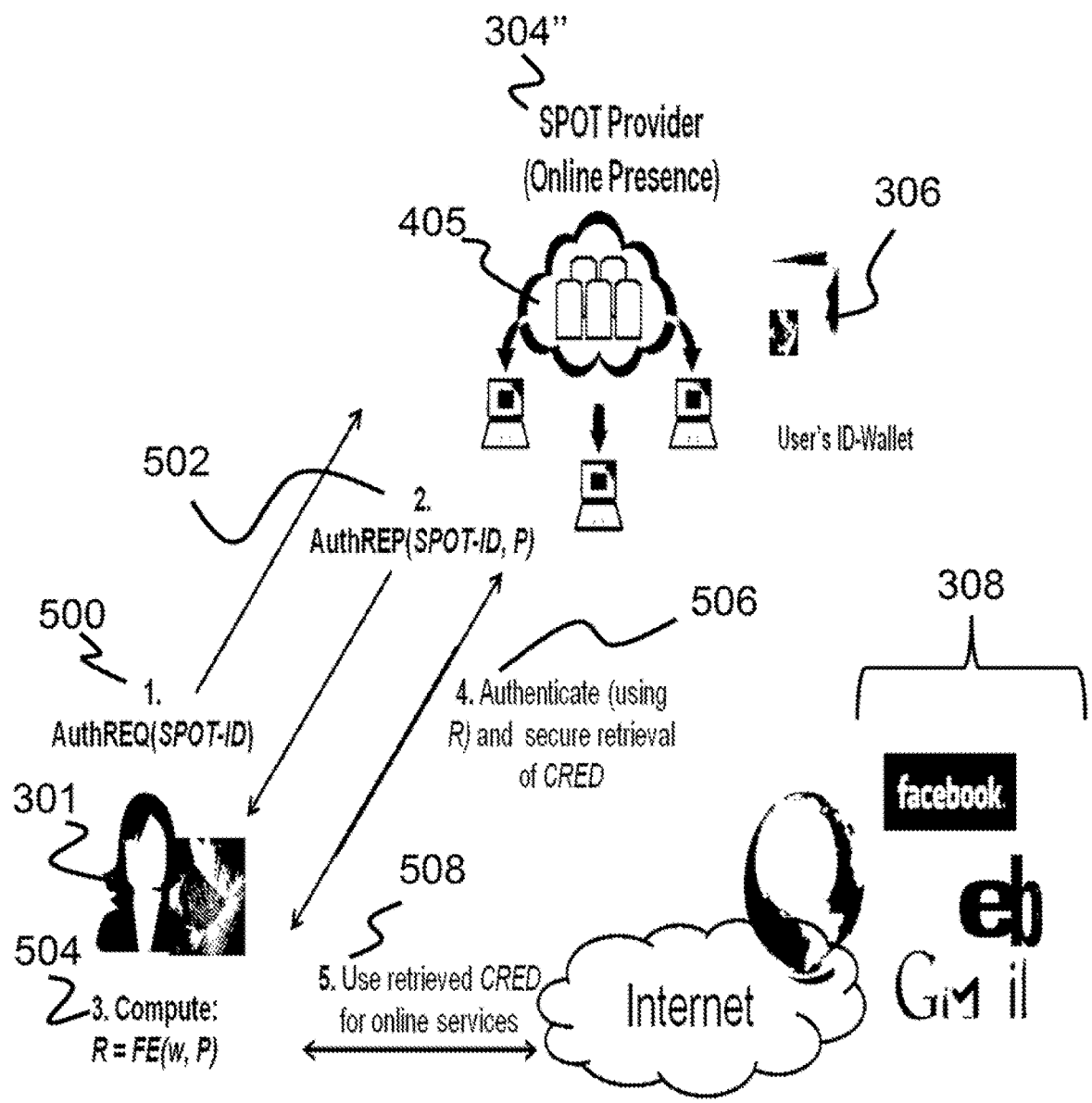
FIG. 5 is a flowchart depicting a SPOT authentication and credential retrieval phase of the operation of the system.

The second phase of SPOT's operation is known as the SPOT Authentication and Credential Retrieval Phase, which is shown in FIG. 5.

Subsequent to the completion of the enrollment phase, users 301 then interact with SPOT provider's online presence 304" to unlock ID-Wallets 306 and retrieve credentials to access online services 308 and perform online transactions according to the following sequence.

First, a user 301 sends her SPOT-ID in an authentication request 500 to the SPOT provider's online presence 304" (i.e., SPOT servers 405). The user typically uses the user client (e.g., a tablet computer, or phone, etc., depicted as element 302 in FIG. 3) to access the internet and send the authentication request 500.

Next, the SPOT server 405 provides an authentication response 502 to the user client by providing user 301 with the FE's helper string (P) that will aid user's client in extracting secret (R) used for authentication and unlocking of the ID-Wallet.

In a third step, the user client uses the FE and supplied biometric to compute 504 secret R required for authentication. Secret R is generated using the process described above, where the FE is a cryptographic primitive that extracts a uniformly random string, R, from the FE's input, w. The user's client may then ensure that the extracted version of R is computed correctly using secure comparison with the stored, encrypted version of R supplied at enrollment. If the two versions of R match, then generation of R was successful.

In a fourth step, a user authenticates 506 to the SPOT server 405. The user 301 uses a secure and privacy-preserving credential retrieval protocol to retrieve credentials from her ID-Wallet 306; the SPOT server 405 does not learn what credential the user 301 retrieved. A non-limiting example of a suitable secure and privacy-preserving credential retrieval protocol includes: using the user's biometric information and the user's client 302, the system generates a current version of R, which may be encrypted and transmitted to the SPOT Provider 304". The SPOT Provider 304" may then compare the current version of R with a stored version of R that was created during the one time registration 400. If verification is successful, then the user may be given permission by the system to use the credentials for online or in-person purchases.

Finally, a user 301 then uses 508 her obtained credentials in online transactions and online services 308. This process will be automatically performed by user's client by directing a browser to the online service 308 and logging-in to use the service via retrieved credentials. Thus, the system allows online services 308 to deposit credentials (including anonymous) into a user's ID Wallet 306, obviating the need to have separate user names and passwords for such services.

In various embodiments, the SPOT provider is external to multiple online service providers/merchants, so retrieved credentials can be used to access multiple providers. Also, here, the system provides the credential to the user, who then provides the credential to the online service provider. In various embodiments, this system also uses a physical location to perform the initial registration, which provides for better verification that a person's actual biometric data is being provided, which may help prevent identity theft. Further and in various embodiments, generation of the original secret R is performed at the SPOT Provider's physical presence, which means that the biometric data is conceivably never transmitted, and can be deleted immediately or simply never stored (or at least never stored outside of RAM). It may simply be convened to the secret R before the secret R is transferred back to the User's client and the SPOT Provider's online presence. Additionally and in various embodiments, the user's client, and the user, do not have access to the credentials unless the SPOT provider gives it to the user before a transaction. In other various embodiments, the SPOT Provider can simply act as an authentication system that notifies the merchant online service provider) that the person is who they say they are, rather than providing a credential to the user to provide to the merchant.

In summary, the system utilizes biometrics to authenticate users and unlock credentials stored in secure ID (that can only be unlocked using user's biometrics). This is performed using cryptographic Fuzzy Extractors for a variety of biometrics and an ID-Wallet that is credential-agnostic and can securely store multiple credentials. The system also preserves user biometric privacy by not storing it on any server and, instead, using the efficient Fuzzy Extractor primitive to authenticate users based on biometrics.

Finally, while this invention has been described in terms of several embodiments, one of ordinary skin in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A method for online identification authentication of a user, the method comprising acts of:
    creating an account for the user at a physical presence of a provider, whereby a user ID is generated, the account is registered, and the user supplies biometric data and a set of credentials;
    performing, at the physical presence of the provider, an authentication of the user's biometric data, wherein the user is authenticated based on use of a Fuzzy Extractor (FE) and an encrypted output of the FE is generated;
    providing the user with the encrypted output via secure communication;
    registering, by the physical presence of the provider, the user ID, the set of credentials, and a FE helper string associated with the FE encrypted output with an online presence of the provider;
    creating an online-generated ID-Wallet of the set of credentials for the user and storing the online-generated ID-Wallet to the online presence of the provider; and
    unlocking, by the user, the online-generated ID-Wallet and retrieving the set of credentials in order to access online services, wherein the online-generated ID-Wallet is unlocked by the user through an interaction with the online presence of the provider
    where in unlocking the online generated ID-Wallet further comprises:
    sending, by the user, the user ID in an authentication request to the online presence of the provider; and
    providing, by the online presence of the provider, an authentication response to a user's client by providing the user with the FE helper string to aid the user's client in extracting a secret used for authentication and unlocking the online-generated ID-Wallet and
    where in retrieving the set of credentials further comprises:
    computing, by the user's client, the secret required for authentication using the FE and the user's biometric data;
    using, by the user, a secure and privacy-preserving credential retrieval protocol to retrieve the set of credentials from the online-generated ID-Wallet, wherein the online presence of the provider does not learn which credential the user retrieves.

2. The method as set forth in claim 1, wherein the retrieved set of credentials are authenticated to allow the user to access multiple online service providers.

3. The method as set forth in claim 1, wherein the physical presence of the provider is a physical storefront.

4. The method as set forth in claim 1, where in accessing online services comprises automatically directing, by the user's client, a web browser to an online service and logging-in to use the online service via the set of retrieved credentials.

5. A system for online identification authentication, the system comprising:
    one or more biometric data readers located at a physical presence of a provider for capturing a user's biometric data; and
    one or more processors and associated memory with executable instructions encoded thereon, such that upon execution, the one or more processors perform operations of:
    creating an account for the user at the physical presence of the provider, whereby a user ID is generated, the account is registered, and the user supplies the biometric data and a set of credentials;
    performing, at the physical presence of the provider, an authentication of the user's biometric data, wherein the user is authenticated based on use of a Fuzzy Extractor (FE) and an encrypted output of the FE is generated;
    providing the user with the encrypted output via secure communication;
    registering, by the physical presence of the provider, the user ID, the set of credentials, and a FE helper string associated with the FE encrypted output with an online presence of the provider;
    creating an online-generated ID-Wallet of the set of credentials for the user and storing the online-generated ID-Wallet to the online presence of the provider; and
    unlocking, by the user, the online-generated ID-Wallet and retrieving the set of credentials in order to access online services, wherein the online-generated ID-Wallet is unlocked by the user through an interaction with the online presence of the provider
    where in unlocking the online generated ID-Wallet further comprises:
    sending, by the user, the user ID in an authentication request to the online presence of the provider; and
    providing, by the online presence of the provider, an authentication response to a user's client by providing the user with the FE helper string to aid the user's client in extracting a secret used for authentication and unlocking the online-generated ID-Wallet; and
    where in retrieving the set of credentials further comprises:
    computing, by the user's client, the secret required for authentication using the FE and the user's biometric data;
    using, by the user, a secure and privacy-preserving credential retrieval protocol to retrieve the set of credentials from the online-generated ID-Wallet, wherein the online presence of the provider does not learn which credential the user retrieves.

6. The system as set forth in claim 5, wherein the physical presence of the provider is a physical storefront.

7. The system as set forth in claim 5, where in accessing online services comprises automatically directing, by the user's client, a web browser to an online service and logging-in to use the online service via the set of retrieved credentials.

* * * * *